United States Patent [19]

Endo et al.

[11] 4,323,041
[45] Apr. 6, 1982

[54] MULTI-CYLINDER INTERNAL COMBUSTION ENGINE OF FUEL INJECTION TYPE

[75] Inventors: Yoshinori Endo, Hamamatsu; Masaaki Yoshikawa, Iwata, both of Japan

[73] Assignee: Yamaha Hatsudoki Kabushiki Kaisha, Iwata, Japan

[21] Appl. No.: 57,095

[22] Filed: Jul. 12, 1979

[30] Foreign Application Priority Data

Jul. 14, 1978 [JP] Japan ................................. 53-85222

[51] Int. Cl.³ ........................................... F02M 32/00
[52] U.S. Cl. .................................. 123/432; 123/308; 123/472
[58] Field of Search ................ 123/52 M, 59 PC, 308, 123/432, 442, 472, 456, 452, 492, 445, 299

[56] References Cited

U.S. PATENT DOCUMENTS

| | | | |
|---|---|---|---|
| 4,140,088 | 2/1979 | Vulpillieres | 123/299 |
| 4,149,496 | 4/1979 | Palma | 123/472 |
| 4,153,014 | 5/1979 | Sailet | 123/492 |
| 4,186,708 | 2/1980 | Bowler | 123/445 |
| 4,216,753 | 8/1980 | Inoue | 123/472 |
| 4,235,205 | 11/1980 | Fuhui | 123/472 |

*Primary Examiner*—Ronald H. Lazarus
*Attorney, Agent, or Firm*—Ernest A. Beutler

[57] ABSTRACT

An induction system for a multiple cylinder internal combustion engine embodying a simplified fuel injection arrangement that reduces the number of injection nozzles. The engine is provided with a relatively large cross sectional area main induction system and a relatively small cross sectional area auxiliary induction system. A valving arrangement is incorporated so that a major portion of the engine charge requirements are supplied to the chambers through auxiliary induction system at idle and low speed. As a result, turbulence in the combustion chamber at the time of ignition is increased to provide improved fuel economy and exhaust emission control. One fuel injection nozzle is positioned in an inlet passage of the auxiliary induction system which serves a plurality of chambers. In this way, one injection nozzle can serve multiple chambers without adversely affecting mixture distribution. In accordance with another embodiment of the invention, pairs of injection nozzles are provided in this common inlet which are fired alternately so that each nozzle serves separate cylinders.

14 Claims, 4 Drawing Figures

MULTI-CYLINDER INTERNAL COMBUSTION ENGINE OF FUEL INJECTION TYPE

BACKGROUND OF THE INVENTION

This invention relates to a multiple cylinder internal combustion engine of the fuel injection type and more particularly to an improved induction system for such an engine.

The advantages of manifold fuel injection as a means for charge forming with internal combustion engines is well known. Basically such fuel injection gives better fuel flow control over a wide speed range. The relatively high cost of injection nozzles and the necessity for providing a separate nozzle for each cylinder or chamber of the engine has, however, deterred wider acceptance of their usage.

It is, therefore, a principal object of this invention to provide an improved induction system for an internal combustion engine in which the simplified fuel injection arrangement may be incorporated.

Although it has been proposed, with engines having conventional induction systems, to employ one fuel injection nozzle for a plurality of cylinders, this arrangement is not completely satisfactory. Due to pulsating and irregular flow patterns through conventional intake manifolds, such arrangements have resulted in unequal mixture distribution between the various cylinders served by a single fuel injection nozzle. Furthermore, when one injection nozzle is provided for multiple cylinders it must be positioned in a common passage of the induction system which serves the cylinders. Thus, the injection nozzle will be spaced a considerable distance from the cylinders which it serves. Because of this spacial difference, engine performance during transitional stages (acceleration and deceleration) will be deteriorated.

It is, therefore, a further object of this invention to provide an improved induction system in which one fuel injection nozzle may serve a number of chambers without variations in mixture strength.

Another reason why the provision of one fuel injection nozzle for a plurality of cylinders has not proven completely satisfactory is the difficulty in providing an injection system which is capable of providing the full load and speed range fuel requirements of a plurality of cylinders with a single injection nozzle. As should be readily apparent, at high engine speeds the single injection nozzle must discharge at a greater number of cycles per minute. Thus, it has been previously necessary to employ very expensive fuel injection systems even though only one nozzle is employed for a plurality of chambers.

It is, therefore, a yet further object of this invention to provide a fuel injection system for an internal combustion engine in which one nozzle serves a number of chambers and yet is capable of providing accurate fuel control even at high engine speeds.

SUMMARY OF INVENTION

The first feature of this invention is adapted to be embodied in an internal combustion engine having a chamber of variable volume in which combustion occurs. Main and auxiliary intake passages, each of which terminates in a respective main or auxiliary intake port, are provided for delivering a charge to the chamber. The auxiliary induction passage has a substantially lesser effective cross sectional area than the main induction passage so that a given mass flow of charge delivered to the chamber through the auxiliary induction passage will enter the chamber at a significantly higher velocity than the same charge flowing through the main induction passage. In accordance with this feature of the invention, a charge forming device is provided for delivering fuel to the chamber only through the auxiliary induction passage. The charge forming device supplies the fuel requirements of the chamber through its entire speed and load range so that all of the fuel for the chamber is delivered to the chamber through the auxiliary induction passage.

Another feature of the invention is adapted to be embodied in an induction system for multiple chambers of an internal combustion engine in which each of these chambers is a variable volume chamber in which combustion occurs. The induction system comprises a plurality of induction passages each serving a respective one of the chambers for delivering a charge thereto. An air intake is also incorporated for receiving an air charge and delivering it to the induction passages for eventual delivery to the chambers. A pair of fuel injection nozzles are incorporated each of which discharges into the air inlet whereby the fuel delivered from each of the nozzles may be delivered to the chambers through the induction passages. Means alternately cause first one of said nozzles to discharge fuel and then the other of said nozzles to discharge fuel so that the discharge of fuel from the nozzles is not coextensive.

DETAILED DESCRIPTION OF THE PREFERRED EMBODIMENTS

Figure 1:
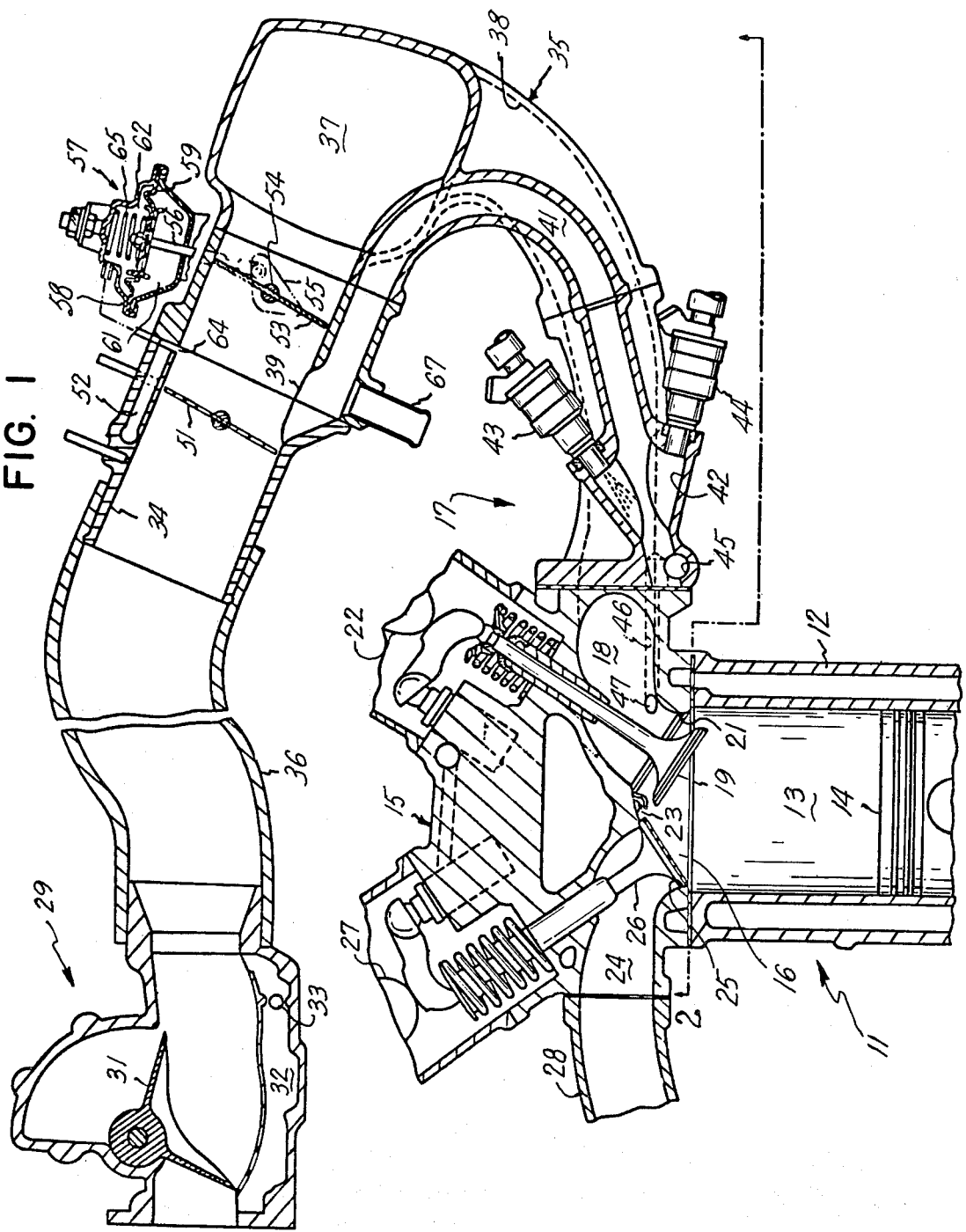
FIG. 1 is a vertical cross sectional view taken in part through a single cylinder of a multiple cylinder internal combustion engine embodying this invention and taken generally along the line 1—1 of FIG. 2.
Figure 2:
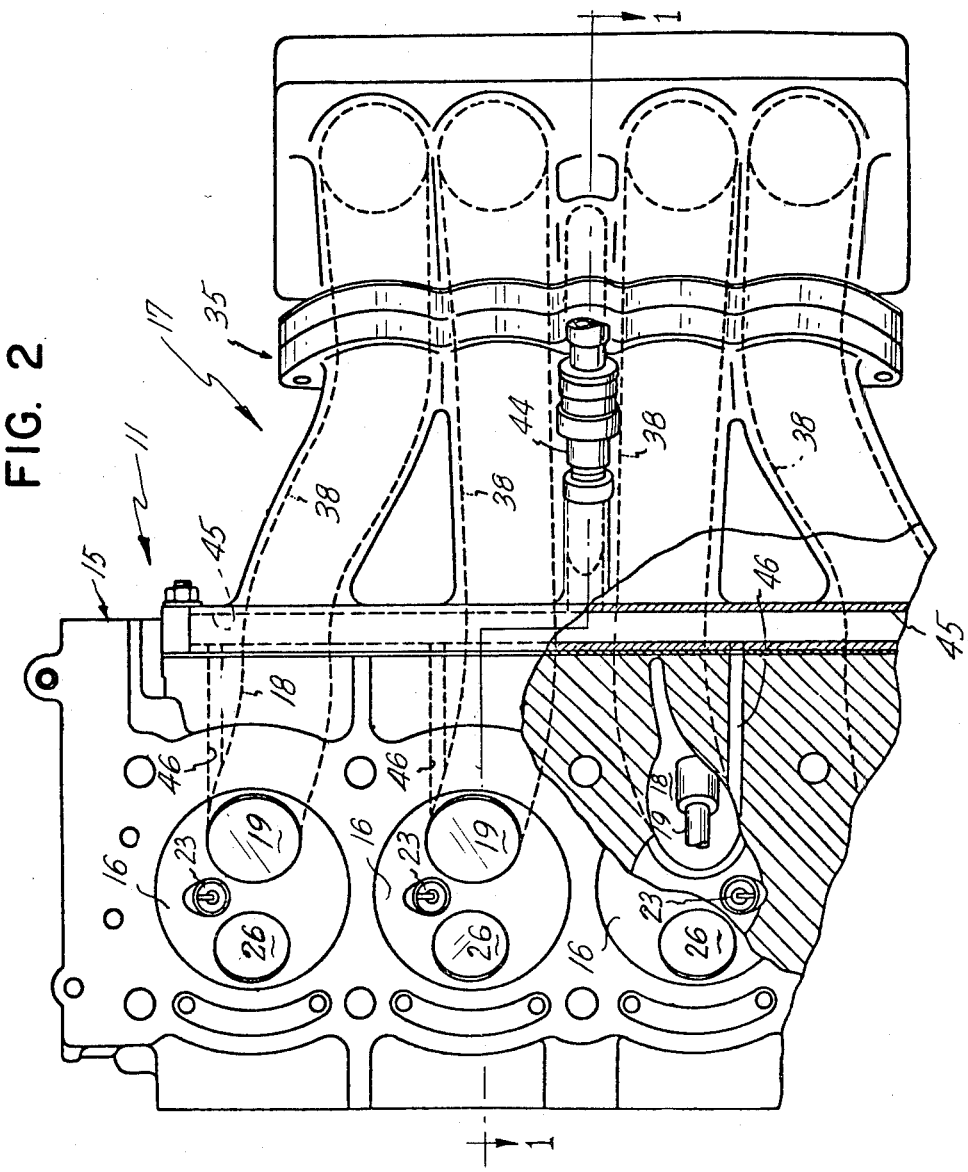
FIG. 2 is a bottom plan view of the underside of the cylinder head and induction system of the engine shown in FIG. 1.

Referring first to FIGS. 1 and 2 of the drawings, a multiple cylinder internal combustion engine is identified generally by the reference numeral 11. The engine 11 includes a cylinder block 12 in which a plurality of cylinder bores 13 are formed. In the illustrated embodiment, the engine 11 is of the four cylinder type, although not all four cylinders are shown. It is believed from the description given that those skilled in the art will readily understand how the invention can be applied to either single cylinder engines or multiple cylinder engines having a number of cylinders other than four.

Pistons 14 are slidably supported in each of the cylinder bores 13 and are connected by means of connecting rods to a crankshaft (not shown) in any known manner. A cylinder head indicated generally by the reference numeral 15, is affixed to the cylinder block 12 and has a plurality of cavities 16 which cooperate with the cylinder bores 13 and pistons 14 to form chambers of variable volume in which combustion occurs. As this description proceeds, the chambers 16 may be referred to as combustion chambers.

A charge is delivered to each of the chambers 16 by means of an induction system, which forms the substance of this invention, and which has been indicated generally by the reference number 17. The induction system 17 includes an intake manifold that delivers a charge to main intake passages 18 formed in the cylinder head 15 each of which communicates with a respective of the chambers 16. An intake valve 19 is provided for controlling the flow into the chambers 16 from the main intake passages 18 through a main intake port 21 formed at the termination of the passages 18. The intake valves 19 are operated in any known manner, such as by means of an overhead mounted camshaft 22 and related valve actuating mechanism.

The charge in the chambers 16 is fired by means of a spark plug 23, there being one said spark plug for each chamber mounted in the cylinder head 15. The spark plugs 23 are fired in any known manner.

In the side of the cylinder head 15 opposite the main intake passages 18, exhaust passages 24 are formed. Each exhaust passage 24 terminates at an exhaust port 25. The flow of exhaust gases from chambers 16 to the cylinder head exhaust passages 24 is controlled by means of exhaust valves 26 which are operated in any known manner, such as by means of an overhead mounted exhaust camshaft 27 and an appropriate valve actuating mechanism. The exhaust gases are collected from the cylinder head passages 24 by means of an exhaust manifold 28 for discharge in any known manner.

In accordance with this invention, the induction system 17 consists of an auxiliary induction system through which a substantial portion of the charge requirements of the chambers 16 at idle and low speed are provided. A considerably larger main induction system is also incorporated for supplying an increasing proportion of the engine charge requirements as load and/or speed increase. In addition to providing the air requirements of the engine at idle and low speed, the auxiliary induction system also provides a conduit by which fuel is delivered to the chamber 16 throughout the entire engine load and speed range.

The induction system 17 includes a main air intake 29 in which an air flow detection device 31 is positioned. A bypass passage 32 having an adjustable flow control 33 is incorporated for bypassing a limited amount of induction air past the detection device 31.

The inlet 29 is connected to air inlet 34 of an intake manifold, indicated generally by the reference numeral 35, by means of a flexible conduit 36. Downstream of the air inlet 34, the manifold 35 is provided with a plenum chamber 37 from which main intake runners 38 extend. The runners 38 each terminate at a respective cylinder head main intake passage 18 so as to define the remainder of the main induction system.

The auxiliary induction system consists of an auxiliary air intake 39 that is formed in the manifold 35 between the intake 34 and the plenum 37. From the auxiliary induction system air intake 39 a single passage 41 extends through the manifold 35 to an enlarged portion 42 in which fuel injection nozzles 43 and 44 are provided. A transverse distribution passage 45 is formed in the manifold 35 downstream of the enlarged portion 42. Auxiliary intake runners 46 extend from the distribution passage 45 throughout the manifold 35 and cylinder head 15 for each of the chambers 16. The auxiliary induction system runners 46 each terminate in auxiliary intake ports 47 that are disposed in the main cylinder head intake passages 18 just slightly upstream of the main intake ports 21. Thus, the auxiliary induction system discharges into the chambers 16 through the auxiliary intake ports 47 and main intake ports 21.

The effective cross sectional area of the auxiliary induction system consisting of the inlet 39, passages 41, 45, and 46, is substantially less than the effective cross sectional area of the main induction system. Therefore, a given mass flow of charge introduced to the chambers 16 throughout the auxiliary induction system will flow at a significantly greater velocity than is delivered through the main induction system. This result is achieved in a manner to be described so as to significantly improve performance and fuel economy at idle and low speed. It should be noted that the ports 21 and 47 are in close proximity. Therefore, there will be substantially no loss in the velocity even through the charge from the induction ports 47 is delivered to the chambers 16 through the main intake ports 15.

A manually operated throttle valve 51 is positioned in the manifold 35 just downstream of its inlet 34 and upstream of the auxiliary induction system inlet 39. The throttle valve 51 is controlled by a suitable accelerator linkage (not shown) in any known manner. In its closed position, the throttle valve 51 has a slight clearance between its periphery and the manifold passage 34. This clearance provides for the idle air flow. If desired, a bypass passage 52 may be also provided around the throttle valve 51 so as to provide additional idle air flow. Furthermore, an adjustment (not shown) may be incorporated for controlling the flow throughout the bypass passage 52.

A control valve 53 is supported in the manifold 35 downstream of the auxiliary induction system inlet 39 and upstream of the main induction system plenum 37. The control valve 35 is automatically operated so as to control the ratio of mixture supplied to the chambers 16 through the main auxiliary induction systems.

The control valve 53 is rotatably supported upon a throttle valve shaft 54 which is suitably journaled in the manifold 35. A bell crank 55 is attached to the exposed end of the shaft 54 and is, in turn, pivotly connected to one end of a link 56 of a vacuum actuator, indicated generally by the reference numeral 57.

The vacuum actuator 57 is supported in any known manner on the manifold 35 and includes an outer housing 58 in which a flexible diaphragm 59 is positioned. The diaphragm 59 divides the interior of the housing 58 into a lower chamber 61 and an upper chamber 62. The lower chamber 61 is an atmospheric chamber and is provided with air at atmospheric pressure through either a vent passage or the clearance which exists between the housing 58 and the link 56. The chamber 62 is a vacuum chamber and experiences induction system pressure or vacuum through a conduit 63 which is in communication with a port 64 formed in the manifold 35 between the throttle valve 51 and the control valve 54. A compression spring 65 is positioned in the vacuum chamber 62 so as to exert a downward bias on the diaphragm 59 and a force which tends to fully open the control valve 53 when the pressures in the chambers 61 and 62 are substantially equal.

OPERATION

FIGS. 1 and 2 illustrate the condition of the engine 11 when it is idling. Under this condition, the throttle valve 51 will be in a fully closed position and the idle air requirements for the engine will be supplied through the clearance around the throttle valve 51 and through the bypass passage 52, as afore described. When the engine 11 is running in this condition, a substantially high vacuum will be experienced in the induction system which is transmitted through the port 64 and conduit 63 to the chamber 62 of the vacuum actuator 57. Atmospheric pressure acting in the chamber 61 will, therefore, urge the diaphragm 59 upwardly and compress the spring 65. The control valve 53 will, therefore, be forced to its fully closed position. All air flow to the chamber 16 will, therefore, be shunted to the auxiliary induction inlet 39 for delivery to the chamber 16 at high velocity through the auxiliary intake ports 47. As a result, a high degree of turbulence will be experienced in the chamber 16 at the time of firing of the spark plugs 23. The turbulence will increase the rate of flame propagation and, accordingly, improve fuel economy of the engine 11 under this extremely difficult engine running condition. Furthermore, good control of the amount of undesirable exhaust gas constituents is also possible.

As has been noted, the fuel injection nozzles 43 and 44 discharge into the enlarged chamber 42 of the auxiliary induction system. The nozzles 43 and 44 are disposed so that they discharge into the chamber 42 at substantially the same angle, even though on opposite sides of the centerline of this chamber. The nozzles 43 and 44 also discharge in the direction of air flow so as to improve the mixture distribution and vaporization.

Because the nozzles 43 and 44 discharge into the auxiliary induction system, the mixture delivered by these nozzles will enter the chamber 16 at high velocity, which velocity is relatively independent of engine speed. Thus, good mixture distribution is achieved within each chamber 16. Furthermore, this high velocity permits good mixture distribution between the respective chamber 16 since the nozzles 43 and 44 discharge into the auxiliary induction system upstream of the distribution passage 45.

In accordance with this invention the nozzles 43 and 44 are fired alternately so that the nozzle 43 will serve a different group of cylinders than does the nozzle 44. This permits much more accurate fuel control, particularly at high engine speeds when a single nozzle would have to fire in a rapid number of sequences. By using alternately firing nozzles, the timing is halved.

Figure 3:
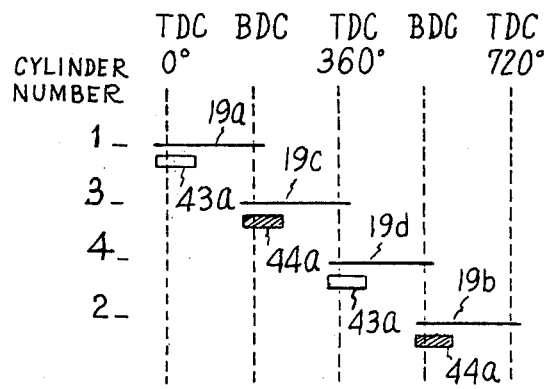
FIG. 3 is a graphical analysis showing the fuel injection timing of the engine shown in FIGS. 1 and 2.

The timing of the injection of the nozzles 43 and 44 may be best understood by reference to FIG. 3. This figure shows the time of the discharge of the nozzles 43 and 44 during a complete firing sequence of the engine. The crank angle during two rotations is indicated in this diagram and the respective cylinder numbers having a firing order of 1-3-4-2 also appears. The opening of the intake valves of the cylinders 1, 2, 3, 4 is indicated in this graph by the horizontal lines 19A, 19B, 19C and 19D, respectively. The duration of firing of the nozzle 43 is indicated by the bars 43A and the duration of firing of nozzle 44 is indicated by the bars 44A.

As may be seen from FIG. 3, when the intake valve 19 of cylinder number one commences to open, the nozzle 43 discharges for a duration indicated by the bar 43A. This degree of discharge is determined by the angular position of the vane of the air flow detector 31 as is well known in this art.

When the intake valve of the next cylinder to be fired (cylinder number three) begins to open, fuel is delivered by the nozzle 44 for a duration indicated by the bar 44A. Again, this duration is determined by the angular position of the vane of detector 31. As the next intake valve, that of the cylinder number 4, begins to open, the nozzle 43 again fires its charge and so on through the sequence of engine operation.

Figure 4:
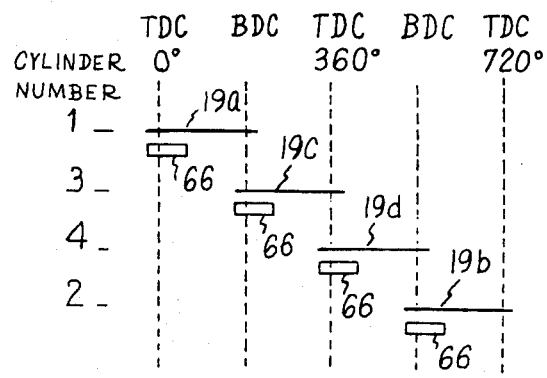
FIG. 4 is a graphical analysis, in part similar to FIG. 3, showing another embodiment of the injection in which only a single fuel injection nozzle is employed.

Rather than having the alternate firing, the engine may be provided with only one fuel injection nozzle which discharges into the chamber 42 of the auxiliary induction system. Although such an arrangement has not been illustrated, the timing sequence for such an embodiment is shown in FIG. 4. In this FIG. 4, the opening of the respective intake valves of the various cylinders is indicated by the bars 19A through D. The duration of discharge of the singular fuel nozzle is indicated by the bar 66. It is believed from the foregoing description that the operation of this embodiment will be obvious to those skilled in the art when considering the graphical representation of FIG. 4.

Returning now to the description of the operation of the engine, by reference to FIGS. 1 and 2, as the throttle valve 51 is progressively opened to either increased speed and/or compensate for an increased load on the engine, the degree of intake manifold vacuum sensed at the port 54 will gradually diminish. If the vacuum signal decreases, the pressure in the chamber 62 will gradually increase and the spring 65 will urge the diaphragm 55 downwardly and progressively open the control valve 53. This increases the proportion to the charge requirements of chamber 16 supplied through the main induction system. There will, however, continue to be flow through the auxiliary induction system and the discharge from the nozzles 43 and 44 will continue to be delivered to the chamber 16 through the auxiliary induction system.

Engine 11 is also provided with an EGR system wherein a portion of the exhaust gases from the exhaust manifold 28 are reintroduced into the combustion chambers 16. In accordance with this arrangement, a conduit and appropriate control valve (not shown) deliver these exhaust gases to an inlet nipple 67 that is provided in the manifold 35 contiguous to the auxiliary induction system inlet 39. As a result, such exhaust gases as are recirculated will be effectively delivered to the chambers 16 in an appropriate and balanced manner.

It should be readily apparent that the described embodiments of the invention are effective to permit the use of a lesser number of fuel injection nozzles than the number of cylinders or chambers of the engine. By having these nozzles discharge into the auxiliary induction system at a portion of this system which serves multiple chambers, good mixture distribution between the respective chambers is insured. Because of the high velocity, the likelihood of mixture fluctuation during transitional stages of the operation are also substantially reduced. In accordance with one embodiment of the invention, the use of a pair of nozzles firing alternately permits accurate fuel control even at extremely high engine speeds while offering a significant cost advantage arrangement in which one nozzle serves each chamber.

In the illustrated embodiment, the inlet for the auxiliary induction system was positioned between the throttle valve 51 and control valve 54. It is to be understood that this invention may also be used in conjunction with arrangements wherein the control valves are positioned directly in the auxiliary induction system rather than controlling the flow through this system in a shunting manner as in the described embodiment. Various other changes and modifications may be made without departing from the spirit and scope of the invention, as defined by the appended claims.

What is claimed is:

1. An induction chamber of variable volume in which combustion occurs, a main induction passage terminating in main intake port for delivering a charge to said chamber, and an auxiliary induction passage terminating in an auxiliary intake port for delivering a charge to said chamber, the effective cross sectional area of said auxiliary induction passage being substantially less than that of said main induction passage so that a given mass flow of charge delivered to said chamber through said auxiliary induction passage will enter at a significantly greater velocity than the same charge delivered through said main induction passage, the improvement comprising a charge forming device for delivering fuel to said chamber only through said auxiliary induction passage, said charge forming device providing all of the chamber fuel requirements at all speed and load ranges.

2. An induction system as set forth in claim 1 wherein the charge forming device comprises a fuel injection nozzle.

3. An induction system as set forth in claim 1 further including valve means for controlling the ratio of communication of the induction passages with the chamber during a given cycle of engine operation.

4. An induction system as set forth in claim 3 wherein the valve means is effective to provide the flow of substantially all the chamber idle and low speed requirements through the auxiliary induction passage and a major portion of the high speed charge requirements through the main induction passage.

5. An induction system as set forth in claim 4 wherein the charge forming device comprises a fuel injection nozzle.

6. An induction system as set forth in claim 1 wherein the engine has a plurality of variable volume chambers and a main induction passage and main intake port and an auxiliary induction passage and auxiliary intake port as defined for each of said chambers.

7. An induction system as set forth in claim 6 wherein there is one charge forming device for a plurality of chambers being provided with a common inlet, the one charge forming device being disposed to discharge into said common inlet.

8. An induction system as set forth in claim 7 wherein the charge forming device comprises a fuel injection nozzle.

9. An induction system as set forth in claim 8 further including a second fuel injection nozzle discharging into the common inlet and means for sequentially discharging fuel from the respective fuel injection nozzles so that one of said fuel injection nozzles supplies fuel for one of the chambers and the other fuel injection nozzle supplies fuel for another of the chambers.

10. An induction system as set forth in claim 9 including valve means for controlling the ratio of communication of the induction passages with the chamber during a given cycle of engine operation.

11. An induction system as set forth in claim 10 wherein the valve means is effective to provide substantially all the chamber idle and low speed requirements through the auxiliary induction passage and a major portion of the high speed charge requirements through the main induction passage.

12. An induction system for multiple chambers of an internal combustion engine, each of said chambers being a variable volume chamber in which combustion occurs, said induction system comprising a plurality of induction passages each serving a respective one of said chambers for delivering a charge thereto, an air intake for receiving an air charge, said induction passages being in communication with said air intake for receiving a charge therefrom and delivering it to said chambers, a pair of fuel injection nozzles each of which discharge into substantially the same portion of said air inlet, said fuel injection nozzles and said air inlet being arranged relative to said induction passages so that the entire discharge from either of said fuel injection nozzles may flow freely into any of said induction passages so that the fuel delivered from either of said nozzles may be delivered through any of said induction passages, and means for alternately causing first one of said nozzles to discharge fuel when one of the chambers is on its intake stroke and then the other of said nozzles to discharge fuel when another of the chambers is on its intake stroke so that the discharge of fuel from said nozzles is not coextensive and that one nozzle serves less than all of said chambers.

13. An induction system as set forth in claim 12 wherein the number of chambers is equally divisible by the number of fuel injection nozzles.

14. An induction system as set forth in claim 13 wherein there are at least two chambers for each fuel injection nozzle.

* * * * *